Aug. 23, 1938.  G. GLOSSMANN  2,127,643
BELT CONVEYER
Filed April 10, 1937
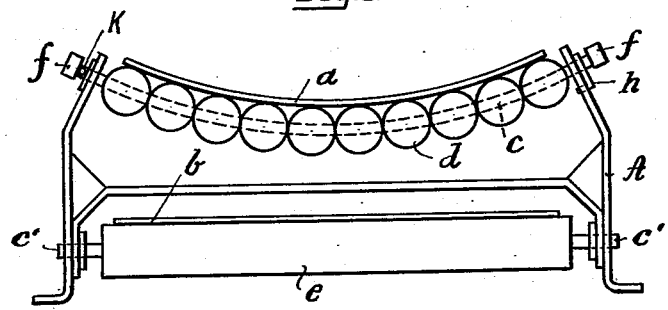
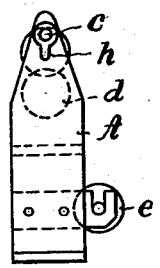
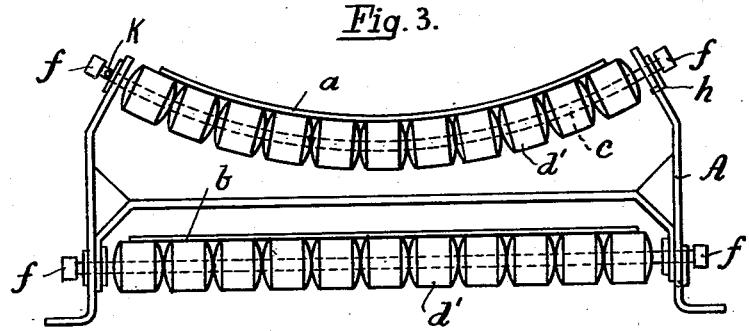
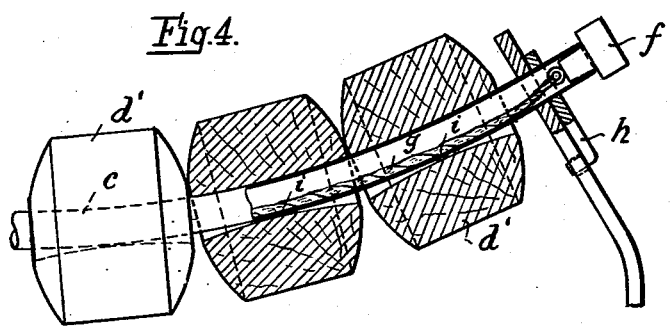
Inventor:
Gustav Glossmann Patented Aug. 23, 1938

2,127,643

UNITED STATES PATENT OFFICE 2,127,643

BELT CONVEYER

Gustav Glossmann, Beuthen, Germany

Application April 10, 1937, Serial No. 136,222
In Poland April 14, 1936

4 Claims. (Cl. 198—192)

This invention relates to a belt conveyer for use in mining operations and the like and of the kind wherein the load-carrying stretch of the belt is maintained in trough-shape by appropriately arranged supporting and guiding rollers.

The object of the present invention is to obtain a more satisfactory support for the belt, and the invention consists esentially in providing at each supporting point a string of rollers made of hard wood impregnated with oil which are threaded like beads on a curved shaft connected at the ends to a supporting frame. The rollers are threaded on the shaft by means of bores which are flared in conformity with the curvature of the shaft.

By this arrangement the transverse bending of the belt will be substantially uniform throughout the width of the belt, and the latter will be subjected to uniform stress which will greatly prolong its life. The rollers will be urged by the curved shaft into close contact with one another, and this has the advantage of ensuring a guiding action which will maintain the belt in a perfectly straight course. The rollers are all of the same diameter and move at the same rate so that frictional engagement between adjacent rollers and consequent loss of power, will be obviated. As the belt bears with equal force against all the rollers, the wear of individual rollers will be very small. It is therefore possible to employ rollers of wood or other non-metallic, light substance which, by reducing the weight, will still further diminish the wear. Hard wood steeped in or impregnated with hot oil is particularly suitable for this purpose since rollers made with such material will mostly work without lubrication. However, the lubrication does not involve any difficulty if the shaft is made hollow. The bores in the rollers whereby the latter are threaded on the shaft, are flared outwards in conformity with the curvature of the shaft so that contact with the shaft will be maintained throughout the length of each bore. The frictional engagement between the belt and the rollers will therefore be greater than that between the rollers and the shaft, so that the rollers will be kept in rotation and so that no sliding movement of the belt relative to the rollers will take place.

Fig. 1 of the accompanying drawing represents a diagrammatic front view of a conveyer belt support constructed according to the invention, Fig. 2 is a side view of the support, Fig. 3 is a front view of the support fitted with a modified form of roller, and Fig. 4 is a sectional view on an enlarged scale of the roller arrangement shown in Fig. 3.

The conveyer belt, which is made of rubber, balata or other suitable flexible material, is operated in the usual manner and carried by rollers mounted in suitably spaced supporting frames A. The rollers which support the load carrying stretch $a$ of the belt are arranged so as to maintain the latter in the shape of a trough in order to increase the carrying capacity of the belt. According to the invention the supporting rollers for this stretch are comparatively short and numerous, and they are threaded like beads on a curved shaft $c$ whose curvature is either circular or parabolic, so that the transverse bending of the belt will be substantially uniform throughout the width of the belt. The shaft is detachably connected at the ends to the frame A, and in order to secure the shafts against rotary displacement it is preferably welded to an arm $h$ having at its free end a lug whereby it engages in an aperture in the frame. The shape of the rollers may be varied. Fig. 1 shows rollers $d$ of spherical shape, and Figs. 3 and 4 shows rollers $d'$ of cylindrical shape formed with convex end faces whereby the rollers abut against one another. The bores whereby the rollers are threaded on the shaft are flared outwards in conformity with the curvature of the shaft, as best shown in Fig. 4 so that contact with the shaft will be maintained throughout the length of the bore. The rollers are preferably made of hard wood steeped in or impregnated with oil, in which case they will be very durable. Other non-metallic material, for instance artificial resin or the like, may be used for the rollers.

For supporting the return stretch $b$ of the belt each frame A, or as many of the frames as required, may be fitted with a single continuous roller $e$, as shown in Fig. 1, each mounted in the frame by means of journals $c'$. However, the rollers for the return stretch of the belt may be similar to those employed for the upper stretch and threaded on a straight supporting shaft, as shown in Fig. 3. The rollers $d'$ may have a diameter of about 75 mm. and a length of about 50 to 65 mm.

When oil impregnated, wooden rollers are employed, lubrication of the rollers may sometimes be omitted. When lubrication is required, this may be done through the shaft $c$ if the latter is made hollow as shown in Fig. 4. The ends of the shaft are closed by plugs $f$, and one of these plugs may be connected to a wick $g$ whereby oil is fed through apertures $i$ in the shaft to the different rollers. As the oil spreads easily towards the central, lower portion of the shaft, the shaft may be without apertures $i$ for the lowermost rollers, so that in this manner a sump will be formed for the oil. With this lubricating arrangement the rollers will run for a long time without attention. The hollow shaft and the wick lubrication may be employed for the lower set of rollers as well as for the upper set.

The curvature of the shafts $c$ may be progressively diminished towards the ends of the conveyer, so that the belt will be gradually flattened out for contact with the operating drums. While one end of the shaft is locked to the frame $a$ by means of the arm $h$, the other end may be fastened by means of a cotter pin $k$ after the removal of which the shaft can be withdrawn for replacement of worn or damaged rollers.

The advantage of employing wooden rollers in this conveyer is considerable in view of the difference in weight as compared with the metal rollers ordinarily used in conveyers of this kind. In the known type of belt conveyer each set of three metal supporting rollers for a belt 650 mm. in width, weighs about 17.5 kg., and the long roller for the return stretch of the belt weighs about 9 kg. The wooden rollers according to the invention employed in a frame A for both stretches of the belt weigh together only 3.3 kg. With a conveyer 300 meters long with supporting rollers arranged at a distance of 1.8 meters apart for the upper stretch $a$ and 3.6 meters apart for the return stretch, a saving in weight of 3,250 kg. is obtained. This represents, with a conveying speed of 1.05 meters per second, a saving of 1.8 H. P.

I claim:

1. In a belt conveyer of the character described, a support for the load-carrying stretch of the belt comprising a curved shaft, a support for said shaft, and a plurality of belt-supporting and guiding rollers threaded like beads on said shaft, said rollers being made of hard wood impregnated with oil.

2. In a belt conveyer of the character described, a support for the load carrying stretch of the belt comprising a curved shaft, a support for said shaft, a plurality of belt-supporting and guiding rollers threaded like beads on said shaft, said rollers being made of hard wood impregnated with oil, and a support for the return stretch of the belt comprising a straight shaft, and oil-impregnated hard wood rollers threaded like beads on said latter shaft.

3. In a belt conveyer of the character described, a support for the load-carrying stretch of the belt comprising a curved shaft, a support for said shaft, and a plurality of sperical belt supporting and guiding rollers threaded like beads on said shaft.

4. In a belt conveyer of the character described a support for the load-carrying stretch of the belt comprising a curved shaft, a support for said shaft, and a plurality of belt-supporting and guiding rollers threaded like beads on said shaft by means of bores which are flared in conformity with the curvature of the shaft.

GUSTAV GLOSSMANN.